US007057307B2

(12) United States Patent
Yokomori

(10) Patent No.: US 7,057,307 B2
(45) Date of Patent: Jun. 6, 2006

(54) CONTROL METHOD OF SLIDING A VEHICLE DOOR BY A POWERED SLIDING DEVICE

(75) Inventor: Kazuhito Yokomori, Yamanashi-ken (JP)

(73) Assignee: Mitsui Kinzoku Kogyo Kabushiki Kaisha, Tokyo (JP)

( * ) Notice: Subject to any disclaimer, the term of this patent is extended or adjusted under 35 U.S.C. 154(b) by 249 days.

(21) Appl. No.: 10/300,012

(22) Filed: Nov. 20, 2002

(65) Prior Publication Data

US 2003/0223175 A1 Dec. 4, 2003

(30) Foreign Application Priority Data

Nov. 20, 2001 (JP) ............................ 2001-355329

(51) Int. Cl.
*B60L 1/00* (2006.01)

(52) U.S. Cl. .................................................... 307/10.1

(58) Field of Classification Search ................ 307/9.1, 307/10.1

See application file for complete search history.

(56) References Cited

U.S. PATENT DOCUMENTS

| | | | | |
|---|---|---|---|---|
| 4,516,124 | A * | 5/1985 | Shannon et al. | 340/960 |
| 5,140,316 | A * | 8/1992 | DeLand et al. | 340/825.69 |
| 5,359,762 | A | 11/1994 | Yokomori | |
| 5,898,284 | A * | 4/1999 | Sasajima | 318/287 |
| 6,075,460 | A * | 6/2000 | Minissale et al. | 340/825.69 |
| 6,091,162 | A * | 7/2000 | Williams et al. | 307/10.1 |
| 6,164,015 | A * | 12/2000 | Kawanobe et al. | 49/360 |
| 2004/0042144 | A1* | 3/2004 | Yokomori | 361/115 |

* cited by examiner

*Primary Examiner*—Lynn Feild
*Assistant Examiner*—Michael Rutland-Wallis
(74) *Attorney, Agent, or Firm*—Browdy and Neimark, PLLC

(57) ABSTRACT

A control method wherein sliding of a sliding door by a powered sliding device is started after sounding an annunciation buzzer when an operating switch is operated, but when a remote control transmitter integrally having an ignition key is operated, the sliding of the sliding door by the powered sliding device is started without operating the annunciation buzzer.

1 Claim, 5 Drawing Sheets

CONTROL METHOD OF SLIDING A VEHICLE DOOR BY A POWERED SLIDING DEVICE

BACKGROUND OF THE INVENTION

1. Field of the Invention

The present invention relates to a control method of sliding a vehicle door by a powered sliding device.

2. Description of the Related Art

Previously, a powered sliding device for a vehicle sliding door has been well known, which slides the sliding door in the door closing direction and door opening direction by rotating a wire drum connected through a wire cable to the sliding door by the power of a motor. The sliding device is started by the operation of an operating switch in the vehicle or a remote control transmitter.

Among the sliding devices, there are some where it is set to sound a buzzer for calling the attention of the persons concerned when receiving an operating signal from the operating switch or the remote control transmitter. In the case of a sliding device of this kind, the start of sliding of the sliding door is delayed by the operating time of the buzzer (about 0.5 sec).

SUMMARY OF THE INVENTION

Therefore, it is an object of the present invention to prevent the unnecessary time lag by switching the use and the nonuse of the annunciation buzzer by using the difference in characteristics between the operating switch provided in the vehicle and the remote control transmitter integrated with a vehicle key.

Most of the conventional remote control transmitters integrally have a vehicle ignition key. The transmitter with a key is possessed by a driver who is the responsible administrator of the vehicle or an administrative person to whom the administration of the vehicle is put from the driver. Accordingly, when the sliding device is started by the transmitter, it is considered that the sliding device is started under the control of the administrator. On the contrary, it is impossible to expect when and under which condition the operating switch provided in the vehicle will be operated. Even though the operating switch is provided near the driver's seat, it can be the object of the mischief of a child, and the opening and closing of the sliding door which is not expected by the driver may be performed. Therefore, when the start of the sliding device is performed by the operating switch, it is very profitable to make the driver and the persons concerned recognize the start of the sliding device by a buzzer. On the other hand, in the case of starting the sliding device by the remote control transmitter, the need for the buzzer is small.

DESCRIPTION OF THE PREFERRED EMBODIMENT

Figure 1:
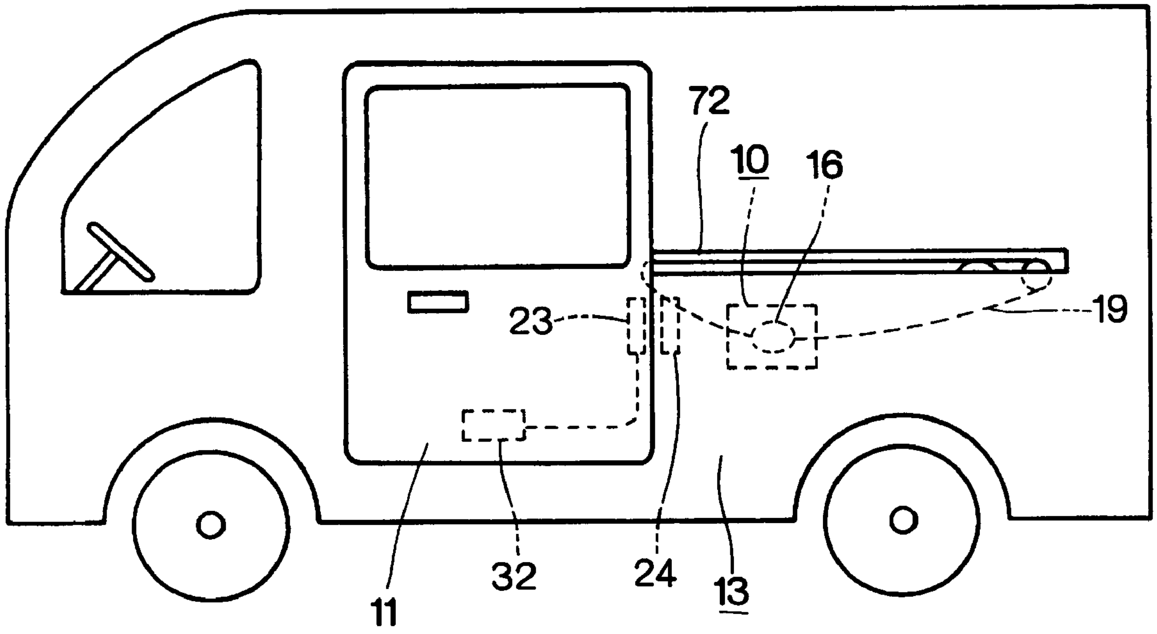
FIG. 1 is a side view of a vehicle with a powered sliding device and a sliding door.
Figure 2:
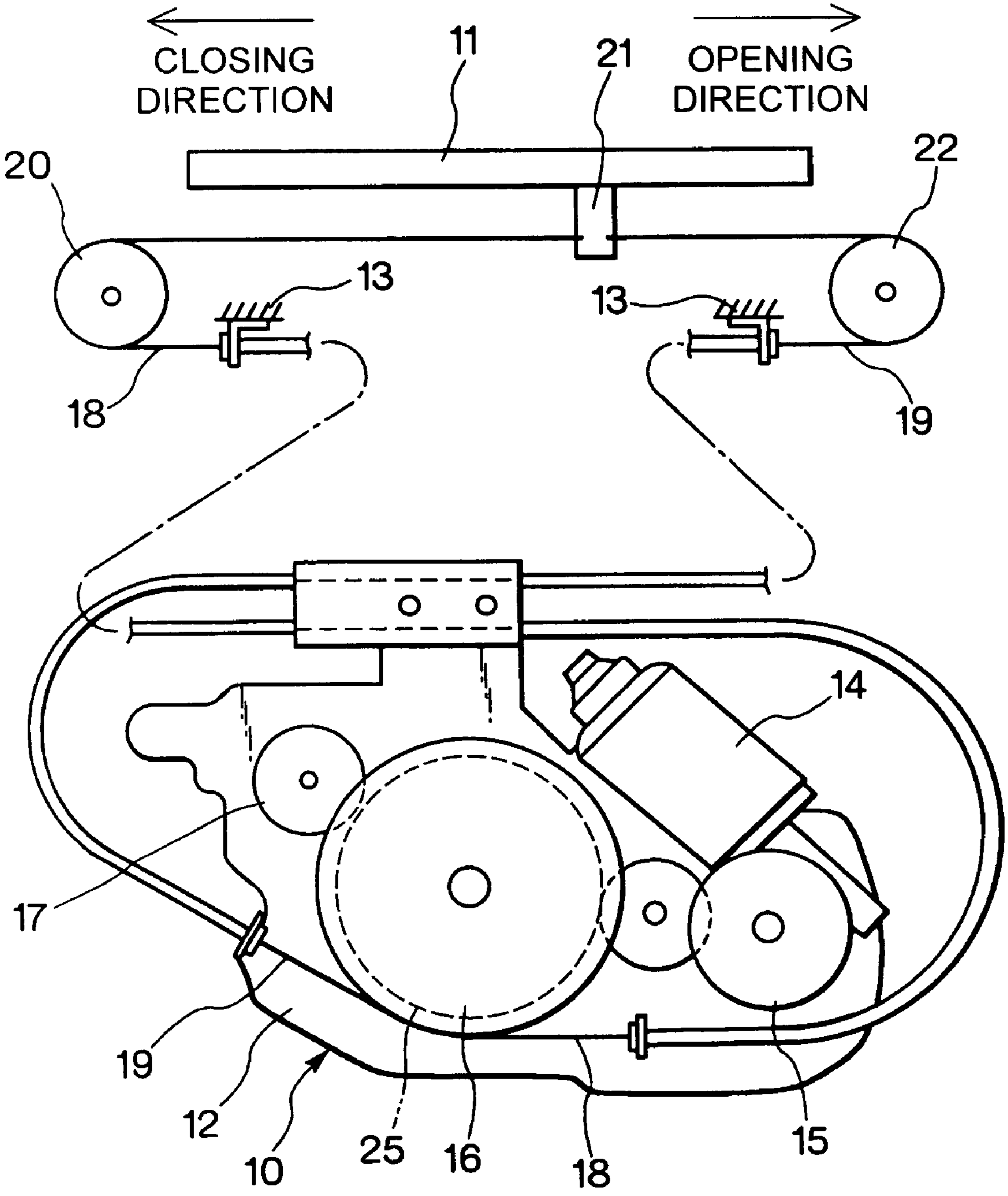
FIG. 2 is an expansion plan of the sliding device and the sliding door.

One preferred embodiment of the present invention will be described by using drawings. FIG. 1 shows the rough relation between a powered sliding device 10 according to the present invention and a vehicle sliding door 11 which slides in the door closing direction and in the door opening direction by the powered sliding device 10, and FIG. 2 shows the expanded relation between both.

The sliding door 11 is slidably attached to a vehicle body 13, and is slidable in the back and forth direction of the vehicle body 13 along a guide rail 72 provided to the vehicle body 13. A base plate 12 of the powered sliding device 10 is fixed to the vehicle body 13, and the base plate 12 is provided with a motor 14, a reduction mechanism 15, a wire drum 16, and an electromagnetic brake 17. The electromagnetic brake 17 operates by the electric control to brake the wire drum 16.

To the wire drum 16, one end sides of two wire cables 18, 19 are connected. The other end side of the first wire cable 18 is connected to a bracket 21 of the sliding door 11 through a front pulley 20 pivoted to the vehicle body 13. Similarly, the other end side of the second wire cable 19 is connected to the bracket 21 through a rear pulley 22 pivoted to the vehicle body 13.

Between the reduction mechanism 15 and the wire drum 16, a clutch mechanism 25 is provided, and the rotational movement of the motor 14 is transmitted to the wire drum 16 through the reduction mechanism 15 and the clutch mechanism 25. The structure of the clutch mechanism 25 is free. For example, an electromagnetic clutch which can be switched to the connected state and the disconnected state between the motor 14 and the wire drum 16 by the operation of an electromagnet, a clutch which is switched to the connected state when the motor 14 rotates and switched to the disconnected state when the motor 14 stops, a clutch which is switched to the connected state by the rotation of the motor 14, but which can keep the connected state even if the motor 14 is stopped, or the like can be used (refer to U.S. Pat. No. 6,359,762).

When the wire drum 16 is rotated clockwise by the power of the motor 14, the first wire cable 18 is wound up, and at the same time, the second wire cable 19 is pulled out, and the sliding door 11 is slid in the door closing direction, and by the counterclockwise rotation of the wire drum 16, the second wire cable 19 is wound up, and at the same time, the first wire cable 18 is pulled out, and the sliding door 11 is slid in the door opening direction.

Figure 3:
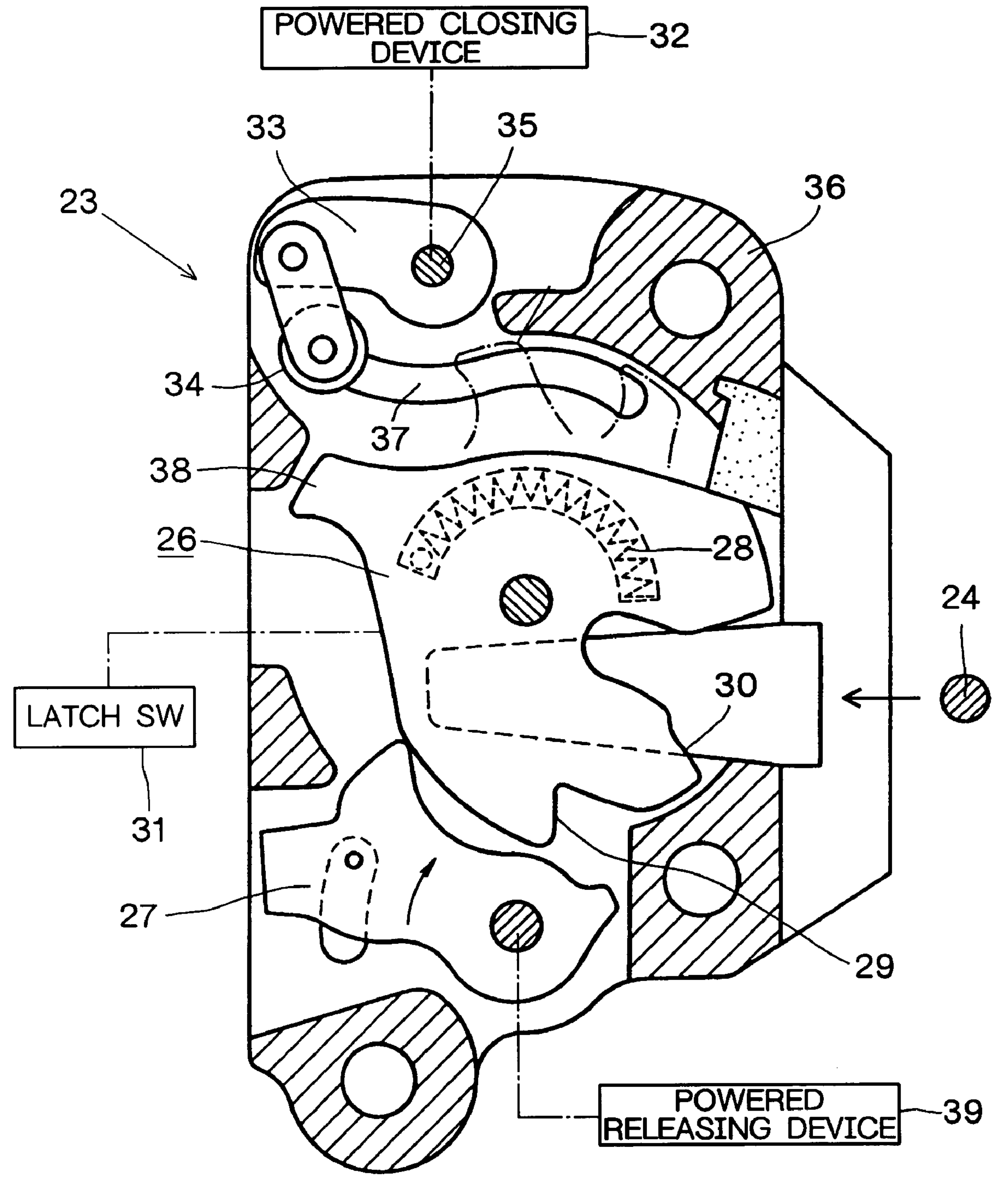
FIG. 3 is a cross sectional view of a latch assembly.

To the sliding door 11, a latch assembly 23 which keeps the sliding door 11 at the door closed position is attached. To a latch body 36 of the latch assembly 23, as shown in FIG. 3, a latch 26 to be engaged with a striker 24 fixed to the vehicle body 13 and a ratchet 27 to be engaged with the latch 26 are pivoted. The latch 26 is urged in the counterclockwise direction by the elasticity of a latch spring 28, and the ratchet 27 is urged in the clockwise direction by the elasticity of a ratchet spring (not shown). When the sliding door 11 moves in the door closing direction, the latch 26 comes into contact with the striker 24, and rotates to the full-latched position where the ratchet 27 is engaged with a full-latch step part 30 of the latch 26 through the half-latched position where the ratchet 27 is engaged with a half-latch step part 29 of the latch 26 from the door open position (unlatched position) shown by the solid line. When the latch 26 comes to be in the full-latched position and the ratchet 27 is engaged with the full-latch step part 30, the sliding door 11 is completely closed.

The latch assembly 23 has a latch switch 31 for detecting the position of the latch 26. The latch switch 31 is turned on when the latch 26 is rotated up to a specified position (hereafter, referred also to as the succeeding point) from the unlatched position by the engagement with the striker 24 while the sliding door 11 is moving in the door closing direction. The timing when the latch switch 31 is turned on is the moment when the latch 26 is initially brought into contact with the striker 24, and the moment before the latch 26 has come to be in the half-latched position.

The latch assembly 23 has a motor powered closing device 32 which operates when the latch switch 31 is turned on, and the output of the powered closing device 32 is transmitted to a driving lever 33. To the driving lever 33, a pressing part 34 is attached, and when the driving lever 33 rotates counterclockwise about a support shaft 35 by the power of the closing device 32, the pressing part 34 moves to the right along a guide groove 37 of the latch body 36. At the moment when the closing device 32 operates, the latch 26 is positioned at the succeeding point where it is initially brought into contact with the striker 24, and therefore, the pressing part 34 moving to the right comes into contact with a latch leg part 38 of the latch 26, and rotates the latch 26 to the full-latched position by the power of the closing device 32, and completely closes the sliding door 11.

The latch assembly 23 has a powered releasing device 39 for releasing the ratchet 27 from the latch 26.

Figure 4:
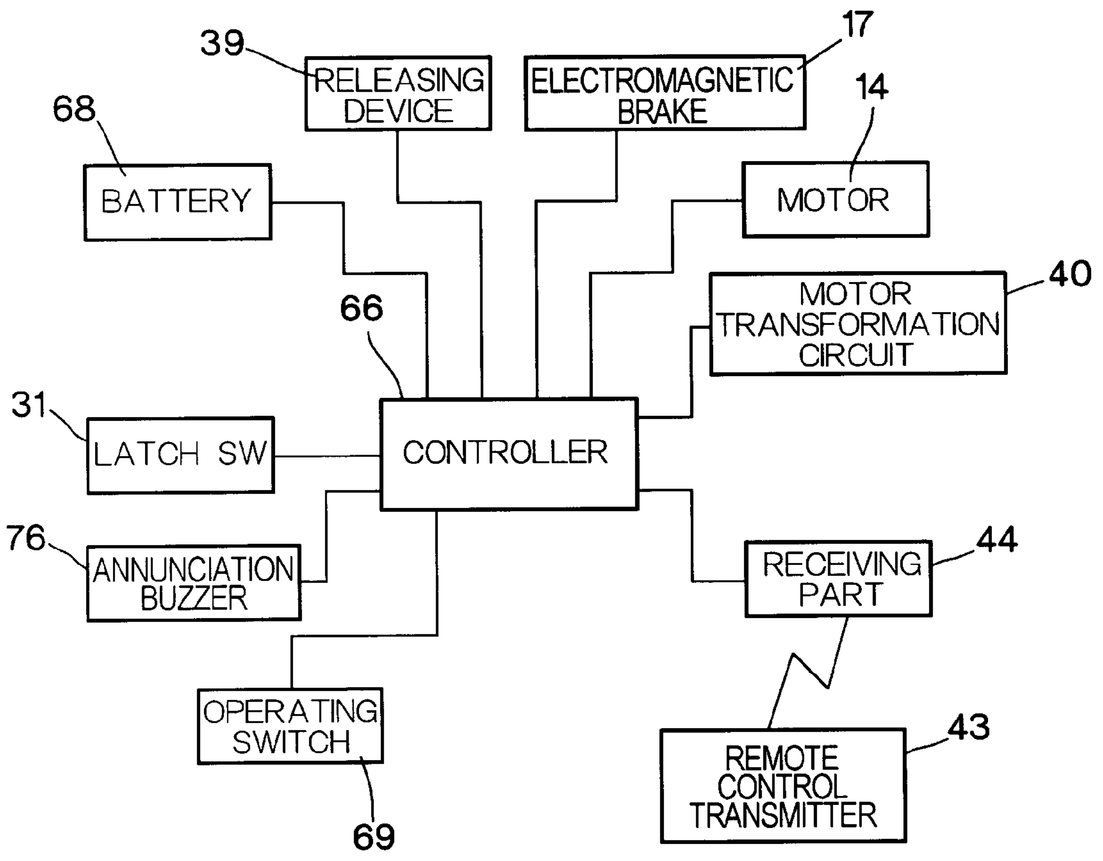
FIG. 4 is a block circuit diagram for performing the control operation of the present invention.
Figure 5:
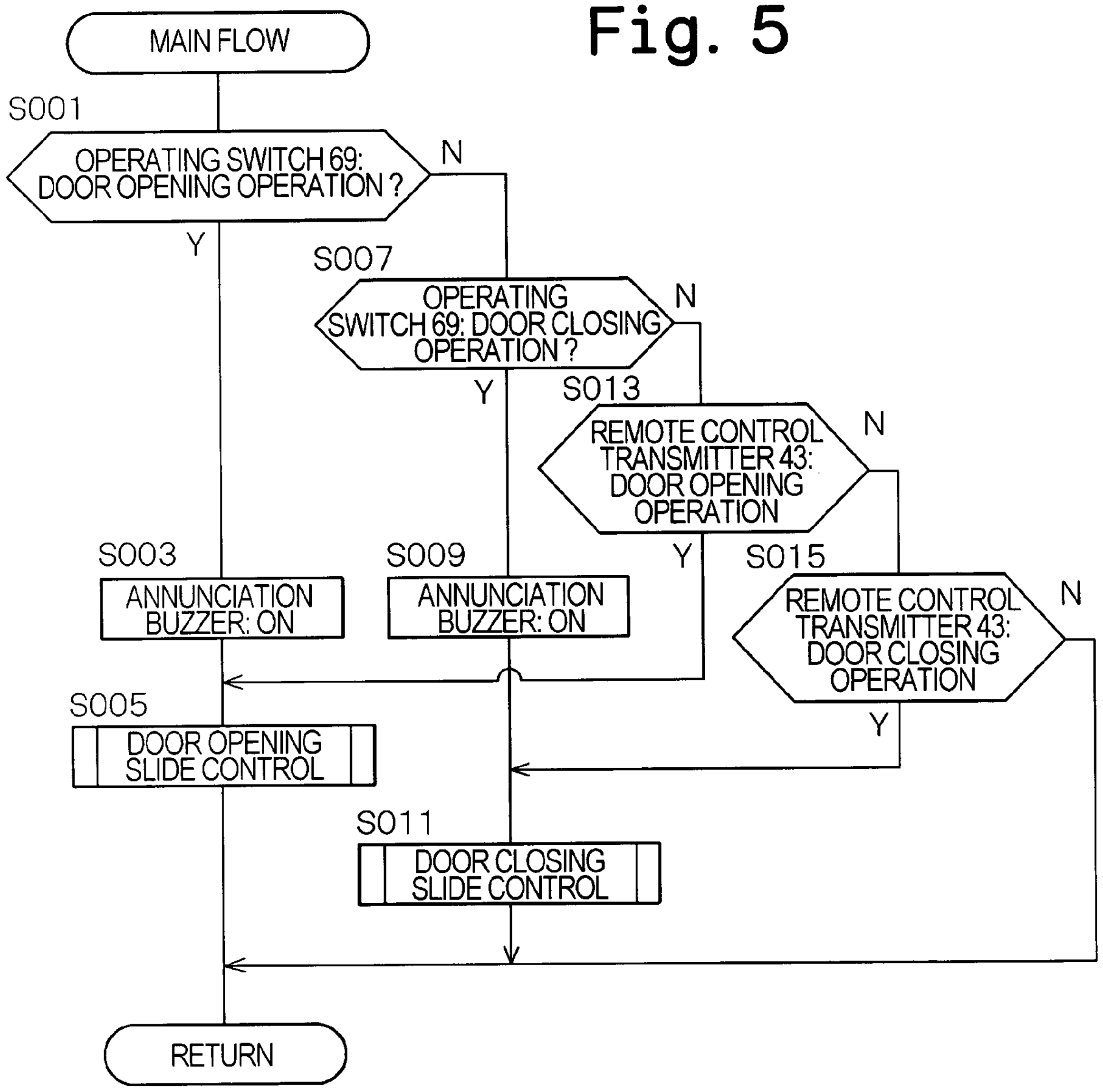
FIG. 5 is a flow chart of the control operation of the present invention.

FIG. 4 is a diagram of a block circuit for performing the control operation according to the present invention. The block circuit has a controller 66, an infrared or radio potable transmitter 43 for the remote control, a receiving part 44 to the transmitter 43, a battery 68 mounted on the vehicle body 13, an operating switch 69, a buzzer 76, and a motor transformation circuit 40 for controlling the output of the motor 14 by the PWM control (DUTY control). The portable transmitter 43 integrally has a vehicle engine key.

Operation

When the sliding door 11 is positioned at the door closed position, if the operating switch 69 is operated to the door opening side, the door opening operation of the operating switch 69 is detected in the step S001, and the controller 66 sounds the annunciation buzzer 76 for about 0.5 second for calling the attention to inform the start of the powered door opening to the persons concerned (S003), and continuously, performs the door opening slide control (S005). In the door opening slide control, the ratchet 27 is released from the latch 26 by the powered releasing device 39 to make the latch 26 free, and the motor 14 is rotated in the door opening direction to slide the sliding door 11 in the door opening direction to a specified position.

When the sliding door 11 is positioned at the door open position, if the operating switch 69 is operated to the door closing side, the door closing operation of the operating switch 69 is detected in the step S007, and the controller 66 sounds the annunciation buzzer 76 for about 0.5 second for calling the attention to inform the start of the powered door closing to the persons concerned (S009), and continuously, performs the door closing slide control (S011). In the door closing slide control, the motor 14 is rotated in the door closing direction to slide the sliding door 11 in the door closing direction to a specified position.

Thus, when the motor 14 of the powered sliding device 10 is started by the operation of the operating switch 69, it is started after sounding the annunciation buzzer 76 for a specified time in advance, and therefore, the driver who is the responsible administrator of the vehicle can instantly grasp the operation of the operating switch 69, and accordingly, even if the opening and closing of the sliding door 11 is performed under a condition which is not expected by the driver, he can deal with this at once.

On the contrary, when the sliding door 11 is positioned at the door closed position, if the remote control transmitter 43 is operated to the door opening side, the door opening operation of the remote control transmitter 43 is detected in the step S013, and the controller 66 performs the door opening slide control (S005) without sounding the annunciation buzzer 76.

Furthermore, when the sliding door 11 is positioned at the door open position, if the remote control transmitter 43 is operated to the door closing side, the door closing operation of the remote control transmitter 43 is detected in the step S015, and the controller 66 also performs the door closing slide control (S011) without sounding the annunciation buzzer 76 at this moment.

Thus, in the present invention, when the powered sliding device 10 is started by the operation of the remote control transmitter 43, the annunciation buzzer 76 is not sounded, and consequently, the sliding movement of the sliding door 11 is immediately started. Furthermore, the remote control transmitter 43 integrated with a vehicle ignition key is possessed by a driver who is the responsible administrator of the vehicle or an administrative person to whom the vehicle key is put from the driver, and therefore, when the sliding device 10 is started by the remote control transmitter 43, naturally, the duty of the safety confirmation has already been performed by the driver or the equal responsible person. Under the situation where the information in advance to the passenger is necessary, the information is performed by the voice of the driver or the like instead of the annunciation buzzer 76, and accordingly, the need of the buzzer 76 for the passenger becomes low. Therefore, even if it is arranged that the annunciation buzzer 76 is not sounded when the powered sliding device 10 is started by the operation of the remote control transmitter 43, no problem occurs in safety.

EFFECT OF THE INVENTION

As mentioned above, according to the control method of the present invention, it is possible to quickly start the sliding movement of the sliding door 11 without neglecting the countermeasure of safety.

What is claimed is:

1. A control method of a powered sliding device which is actuated by operation of an operating switch in a vehicle or a remote control transmitter integrally having a vehicle ignition key to slide a vehicle sliding door slidably attached to a vehicle body in a door opening direction or in a door closing direction by the power of a motor, wherein sliding of the sliding door by the powered sliding device is started after sounding an annunciation buzzer when the operating switch is operated, but when the remote control transmitter is operated, the sliding of the sliding door by the powered sliding device is started without operating the annunciation buzzer.

* * * * *